United States Patent
Naccache et al.

(10) Patent No.: US 8,495,600 B2
(45) Date of Patent: Jul. 23, 2013

(54) DISPLAY METHOD, CORRESPONDING COMPUTER PROGRAM AND DEVICE

(75) Inventors: David Naccache, Paris (FR); Pavel Polechtchouk, Paris (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 571 days.

(21) Appl. No.: 12/704,070

(22) Filed: Feb. 11, 2010

(65) Prior Publication Data

US 2010/0211929 A1    Aug. 19, 2010

(30) Foreign Application Priority Data

Feb. 11, 2009    (FR) ...................................... 09 50863

(51) Int. Cl.
*G06F 9/44*    (2006.01)
(52) U.S. Cl.
USPC ............ 717/144; 717/131; 717/133; 717/143
(58) Field of Classification Search
USPC ................................................ 717/124–150
See application file for complete search history.

(56) References Cited

U.S. PATENT DOCUMENTS

2005/0204344 A1* 9/2005 Shinomi ....................... 717/124
2005/0246656 A1    11/2005 Vasilev et al.

OTHER PUBLICATIONS

French Search Report dated Jul. 23, 2009 for corresponding French Application No. 09 50863 filed Feb. 11, 2009.
Anonymous "Siteground Dreamweaver Tutorial" Online, Feb. 2, 2009, pp. 1-27 XP002538353.

* cited by examiner

*Primary Examiner* — Chuck Kendall
(74) *Attorney, Agent, or Firm* — David D. Brush; Westman, Champlin & Kelly, P.A.

(57) ABSTRACT

A method is provided for displaying the properties of a source code element of a computer program being edited. The includes selecting, within the source code, the source code element; searching, within the source code, a set of related code elements of the selected source code element, the elements of the set comprising typified properties; creating a data structure comprising the properties of the code elements of the set of code elements; grouping, within the data structure, the properties in function of their types; displaying the properties grouped within a portion of a display displaying the source code.

7 Claims, 3 Drawing Sheets

DISPLAY METHOD, CORRESPONDING COMPUTER PROGRAM AND DEVICE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to creation of computer applications.

The present disclosure relates more particularly to the correction of such computer applications during functional or unit test operations or even during corrective maintenance operations.

The creation process for computer applications, such as "web" applications involves many steps: the drafting of specifications, drafting of test documents, creation of the application itself as well as test and applicative correction phases. Once all of these steps have been carried out, the application is ready to be put into production. Following on from this production launch, corrective maintenance operations may be carried out.

Test and maintenance steps require frequent updates of the application code. For a "web" type application, these updates are made even more complex by the fact that often, a "web" type application concerns many software layers; a layer for access to the data base, a "business" layer that handles the functions specific to the business in relation to the application and a presentation layer that handles the display of the data on the screen. Other layers may also be involved and make the application more complex.

BACKGROUND OF THE DISCLOSURE

Solutions exist for facilitating the correction of errors present in computer applications. These solutions are most often implemented in the IDE ("Integrated development environment"). Such IDEs are most often in the form of a screen wherein it is possible to select components which are integrated into the application, or directly from the source code. The selection of one of these elements of the application leads to the appearance of a set of properties related to the element selected.

For example, when the element selected is a component for accessing to a database which has been placed on a user interface of an application to be created, the properties may be: location of the data source, type of data source, protocol for accessing to the data source, etc.

Such an approach by "component" is especially used in "CodeGear™" IDEs, such as for example "Delphi™". The selection of a component causes the appearance of its properties in a specific part of the screen.

In the development of Web applications for example Java, PHP or directly in HTML, the "Eclipse™" IDE is very often used. Once again, the selection of a portion of source code (for example a java object) or even the opening of a source code file causes a window to open or appear which contains a set of properties. This window is called an "outline".

Other implementations of this principle may also be seen in the "Adobe™" "Dreamweaver™" application. When a user selects a part or an element of an HTML page being edited, the editor (the IDE) displays in a window elements representing properties associated to the tag that is selected: for example if the text selected by the user is framed in a tag <TD></TD>, representing a cell of a table, the properties associated to this tag will be displayed in the properties window of the element selected: the user may then modify the values of the properties associated to this tag: the colour of the background of the cell of the table, the alignment of the text in the cell, the colour and the font of the text, any actions that are to be carried out.

Quite often, the user is confronted with a problem: in the previous example, as the text is surrounded by the tag <TD></TD>, only the properties of this tag will be presented in the modification window. However, this tag <TD></TD> is itself surrounded by a tag <TR></TR>, which is itself surrounded by a tag <TABLE></TABLE>. Whereas in the case of HTML language, as it is the case for many other languages, it is possible that several properties of other elements interfere with the selected element. In the previous case, if the property "Backgroundcolor" is considered, this property may be modified in each of the tags <TD></TD>, <TR></TR> and <TABLE></TABLE>.

Consequently, the user who selects a text located between the tags <TD></TD> and who wishes to modify the value of the property "Backgroundcolor" from red to blue, must, if the value of this property is not defined in the tag <TD></TD>, successively select the tags <TR></TR> and <TABLE></TABLE> to identify the tag for which the value of the property "Backgroundcolor" has been defined to modify this value.

This example, which is not restrictive but is very demonstrative and quite simple, illustrates the difficulties encountered by developers of software applications: the properties of the code elements may very often be defined in several places of the source code of the application, which does not facilitate the maintenance or the correction of the application in question as this obliges the developer to navigate in many portions of source code looking for the element for which he wishes to modify certain properties.

SUMMARY

An aspect of the present disclosure relates to a method for displaying the properties of a source code element of a computer program being edited.

According to an aspect of the disclosure, such a method comprises:

selecting, within said source code, said source code element;

searching, within said source code, a set of related code elements of said selected source code element, wherein said elements of said set comprise properties which have a type;

creating a data structure comprising said properties of said code elements of said set of code elements;

grouping, within said data structure, said properties in function of their types;

displaying said properties grouped within one portion of a means of display of said source code.

Consequently, by grouping within a single and same display portion (for example a specific window or a specific pop up) all of the properties of other elements that may be used to influence the source code element previously selected by the user, the method facilitates the correction and the maintenance of the source code in question by avoiding the need for several manipulations by the user.

According to one specific embodiment, said display method further comprises, prior to said grouping step, deleting, within said data structure, properties which may not be used to influence said source code element previously selected by said user.

Consequently, the method avoids leading the user into mistakes by presenting, within the display portion, properties which may not be used to influence the element selected by the user.

According to one specific characteristic of the disclosure, said display method further comprises, prior to said grouping step, deleting, within said data structure, properties which do not have values.

Consequently, only the properties which have already been valued (which is to say the properties that have already received a value) are displayed. This consequently avoids displaying too much information to the user and the maintenance of the computer program is thus facilitated.

According to one specific embodiment, said display method comprises, prior to said selection step and during the editing of said source code:
  creating a hierarchical syntax tree for said source code, comprising for each element of said source code, at least one parent element;
  memorising said syntax tree.

Consequently, an aspect of the disclosure allows a hierarchical data structure that is representative of the source code to be kept permanently up to date.

According to one specific exemplary feature, said search step comprises an identification step, within said memorised syntax tree, of said at least one parent element of said selected element.

Consequently, an aspect of the disclosure allows a rapid search to be made for the elements related to a selected element.

An aspect of the disclosure also relates to a system for displaying the properties of a source code element of a computer program being edited.

According to an aspect of the disclosure, such a system comprises:
  means for selecting, within said source code, said source code element;
  means for searching, within said source code, a set of related code elements of said selected source code element;
  means for creating a data structure comprising properties of said code elements of said set of code elements;
  means for grouping, within said data structure, said properties in function of their types;
  means for displaying said properties grouped within a portion of a display means of said source code.

According to another aspect, the disclosure also relates to a computer program that may be downloaded from a communication network and/or stored on a support that may be read by a computer and/or executed by a micro-processor, and which comprises program code instructions for the execution of the display method as previously described.

BRIEF DESCRIPTION OF THE DRAWINGS

Other characteristics and advantages will become clearer upon reading the following description of an exemplary embodiment, provided simply by way of example and in no way restrictively, and the appended drawings, among which.

DETAILED DESCRIPTION OF ILLUSTRATIVE EMBODIMENTS

1. Reminder of an Exemplary Principle of an Aspect of the Disclosure

It is stated that as part of the present disclosure, an element may be any part of the code, such as a visual check or a block of source code, that may be selected in a man machine interface of a software development application.

In at least one embodiment, an aspect of the disclosure comprises means for grouping properties which are associated to a portion of code selected by the user (such as a specific element of code). A property is a named Attribute of an object, a check or an element (hereafter called element). The properties define the characteristics of the object such as the size, the colour, the position on the screen or the state of an object (activated or deactivated, for example). The properties are of different types: the size is a type of property in the same way as the colour, the position, the database to which the object is connected, etc. The properties may be blank (they do not contain a value) or valued (they have a value).

For example, in the case of the edition of a file containing code in HTML format, an aspect of the disclosure permits the properties of a same type concerning a selected source code element to be grouped in a single location that is easily accessible to the developer.

Consequently, the developer sees immediately in one view the location of the value of the source code that he wishes to modify. For example, the property "Backgroundcolor" that may be modified for many elements of a HTML source code will be displayed in a single and same location (in a portion of a specific window), as many times as there are tags that could modify this property for the selected source code element. The value of this property may for example be "black".

More precisely, in the context of the previous example, if the source code element selected by the user is a text inside a tag <TD></TD>, at least three "Backgroundcolor" properties will be displayed in the window or the portion of window considered: a "Backgroundcolor" property linked to each tag <TD></TD>, <TR></TR> and <TABLE></TABLE>.

Consequently, the user has rapid access to the properties and does not need to navigate from one tag or a set of tags to another and may thus easily identify the tag in which the value of the property that he wishes to modify has been defined.

The correction or the maintenance of the software application is consequently greatly facilitated. An aspect of the disclosure operates contrarily to the preconceptions of those skilled in the art. Indeed, rather than rationally grouping the properties by element, an aspect of the disclosure allows the properties to be grouped by type, independently of the elements to which these properties belong. This type of grouping is very useful for correction or applicative maintenance operations and may be used in a software development application when the program developed by the user is being maintained for example.

Figure 1:
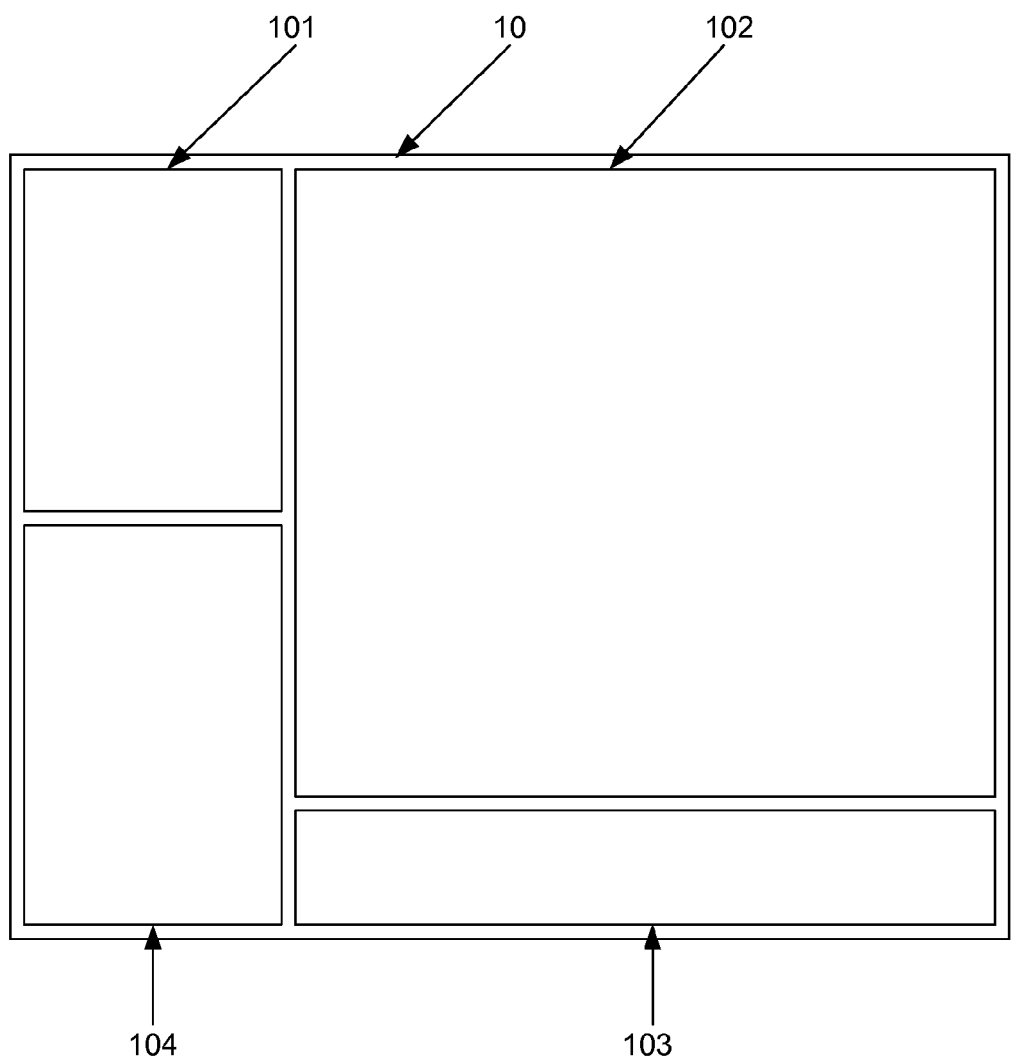
FIG. 1 shows the display produced by a web browser from a HTML code.

Now in relation to FIG. 1, a standard graphic interface (10) of a software development application is presented. Such an interface comprises a file tree structure (101), a code editing window (102), a preview or compilation or search result presentation window (103) and a window for the code being edited (104). This last window (104) may comprise properties related to the object or the element being edited.

The previous examples are only provided by way of illustration. The disclosure and/or the claims appended hereto are in no way restricted to this specific example. Indeed, the method may also be implemented in many types of software development applications such as the "Eclipse™", "Dreamweaver™" and "Delphi™" applications and for many other software application development languages.

In the following description, the case of an exemplary embodiment for the HTML code is used.

2. Description of an Embodiment

In this embodiment, the implementation of the HTML tags language is provided. HTML language is a language which allows pages to be created which are displayed by a Web browser. The HTML language is a tag language as it comprises instructions which influence the HTML page renderer of the Web browser and these instructions are in the form of tags surrounding the elements defined in the HTML page.

Figure 2:
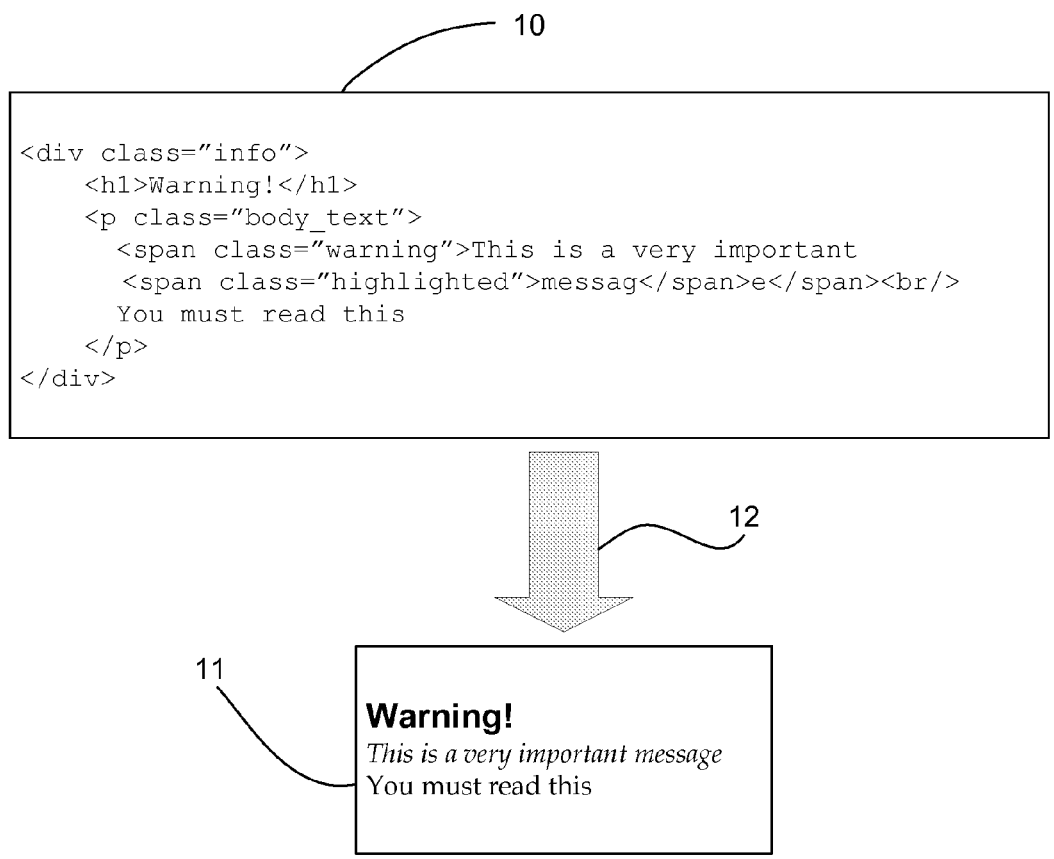
FIG. 2 illustrates an interface of a software development application in which, according to one embodiment of the of the disclosure, the properties of the elements are displayed.

Now in relation to FIG. 2, a portion of HTML code (10) is presented and the result (11) of the interpretation (12) of this HTML code by a Web browser, which is to say the corresponding display.

The HTML code contains many tags such as for example the tags <H1>, <P> and <SPAN>.

These tags are used to indicate to a web browser the manner of displaying the contents of the page. The use of the HTML language is almost systematically accompanied by the use of "CSS" ("Cascading Style Sheets").

These cascading style sheets (and the computer language that is used to construct these cascading style sheets) are used to describe the presentation of HTML and XML documents. The advantage of cascading style sheets is that theoretically they allow all of the choices of presentation and decoration of the HTML elements which form the page (the style sheet) to be grouped in a single file. They therefore also contain properties related to the HTML code elements. Cascading style sheets are also used in the conversion of files to the XML format to generate HTML code.

In use however, inventors have discovered that cascading style sheets are rarely used from start to finish in the development of a web application providing the browser with HTML code.

Indeed, the use of a style sheet is used relatively often in the creation of the application: starting out with good intentions, the developers are quite inclined to separate efficiently the presentation (the cascading style sheets) and the data. During maintenance or correction of the code, on the other hand, cascading style sheets are used less often: frequently, the person who created the application is not the one who carries out the corrective maintenance and a certain degree of knowledge of the application is lost with this change.

In this embodiment, it is therefore proposed to group together the properties of a same type, including the properties from a style sheet, in a same portion of screen or a same window in the screen. This grouping is carried out when an element or a portion of element is selected by the user. This selection may be carried out directly in the source code or even in a "WYSIWYG" ("What You See Is What You Get") presentation mode.

Figure 3:
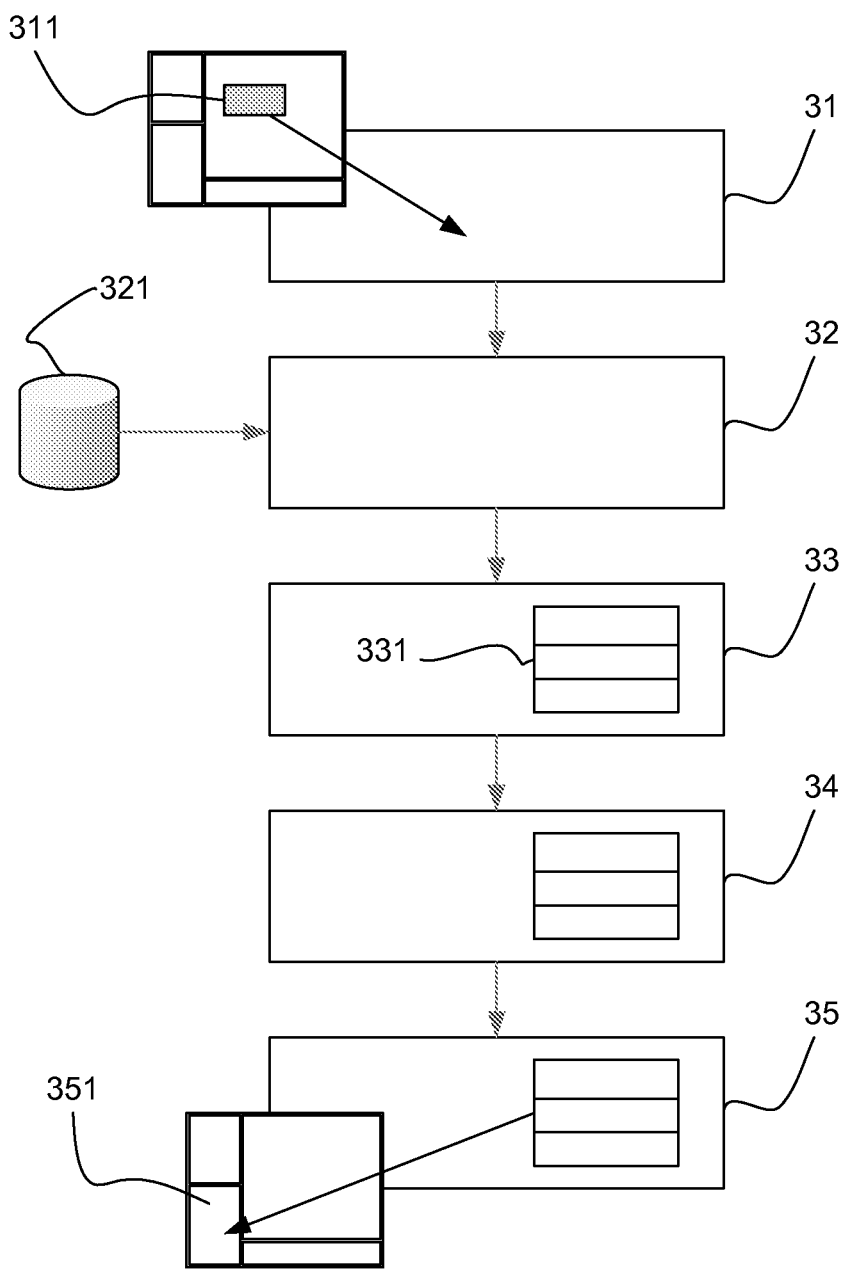
FIG. 3 illustrates an embodiment of the method.

In relation to FIG. 3, the general steps of the method are presented. It comprises:

selecting 31, within the source code, the source code element 311. This selection is made by the user.

searching 32, within the source code 321, a set of related code elements of said selected source code element;

creating 33 a data structure 331 comprising properties of the code elements of the set of code elements;

grouping 34, within said data structure, said properties in function of their types;

displaying 35 said properties grouped within a portion of a display displaying the source code 351.

In a first variant of this embodiment, the selection of an element or a portion of element leads initially to the display, in the form of a list, of elements which influence the properties of the element selected. Following this display, the user is able to select, from the list, the element that he is interested in. Subsequently, the properties of the element selected are for example displayed, with the possibility for the user of backtracking, which is to say to return to the list of elements.

In a second variant of this embodiment, the selection of an element or a portion of element leads to the defining of a list of properties, which are displayed. This list groups together the properties by type: it is consequently possible for the same property to appear several times in this list. The provenance of the property (the related element to which it belongs) is shown by suitable means, such as an icon, an information bubble or any other means, so that the user is not disconcerted or lost off by this display.

Consequently the user has the possibility of immediately seeing which property needs to be modified and does not have to select one by one the related elements to identify the one whose property needs to be modified.

According to another variant of this embodiment, only the properties which are effectively used are displayed. Consequently, after the elimination of the properties which do not influence the element selected, the method makes a new selection so that only the properties which are valued are displayed: consequently, when a single property of a single element is valued, it is the only one to be displayed. When several properties of the same type are valued, the several properties are the only ones to be displayed.

In this way, the user is sure to respect the choices of implementation and presentation that have been made previously by not modifying one property in place of another.

Of course it is possible to switch from the mode where all of the possible properties are displayed to the mode where only the properties effectively used are displayed, what is important is that this concerns the properties of the related elements.

3. Management of the Source Code

At the level of the source code itself, an aspect of the disclosure breaks it down into a syntax tree. The tree is stored in memory when the source code is edited. To identify the elements which influence an element selected by the user (the related elements), an aspect of the disclosure proposes a simple and rapid method: the elements which influence the selected elements are the parents, in the tree, of the element selected.

Consequently, considering the example of the tags <TD></TD>, <TR></TR> and <TABLE></TABLE>, the father of the element <TD></TD> is the element <TR></TR> and the father of the element <TR></TR> is the element <TABLE></TABLE>. Any styles that are associated to cascading style sheets in the elements successively taken into account are also displayed.

According to another variant of this embodiment, only the properties which may actually influence the element or the portion of element selected are displayed. Consequently, the properties which do not have an impact on the element selected are not displayed, so as to avoid lengthening the list with useless properties.

To make this selection of properties, several methods are possible including:

The use of a similarity criterion: only the properties of related elements which have the same name or a similar name to those of the element selected are displayed (for example "Color" or "BackgroundColor");

The use of a cross reference table, which permits an influence diagram to be defined, containing the relationships between the various properties of the various elements.

This influence diagram is checked to determine the properties to be displayed in function of the element selected. This influence diagram is determined in advance in function of the language. It may be represented in the form of a data tree structure and/or be implemented in a database.

Although the present disclosure has been described with reference to one or more examples, workers skilled in the art will recognize that changes may be made in form and detail without departing from the scope of the disclosure and/or the appended claims.

What is claimed is:

1. A method of displaying properties of a source code element of a computer program being edited, wherein said program is written in an object type or component type language, wherein the method comprises the following steps, implemented by a software development application executed by a processor:

selecting, within said source code, said source code element through an interface of the software development application;

searching, within said source code, a set of related code elements of said selected source code element, said elements of said set comprising properties, which have a type;

creating a data structure comprising said properties of said code elements of said set of code elements;

grouping, within said data structure, said properties in function of their types; and displaying said properties grouped within a portion of a display displaying said source code.

2. The method for displaying according to claim 1, wherein the method further comprises, prior to said grouping step, deleting, within said data structure, properties which cannot be used to influence said source code element selected beforehand by said user.

3. The method for displaying according to claim 1, wherein the method further comprises, prior to said grouping step, deleting, within said data structure, properties which do not contain values.

4. The method for displaying according to claim 1, wherein the method comprises, prior to said step of selecting and during the edition of said source code:

creating a hierarchical syntax tree for said source code, comprising for each element of said source code, at least one parent element; and memorising said syntax tree.

5. The method according to claim 3, wherein said search step comprises identifying, within said memorised syntax tree, said at least one parent element of said element selected.

6. A system for displaying properties of a source code element of a computer program being edited, wherein said program is written in an object type or component type language, wherein the system comprises:

means for selecting, within said source code, said source code element;

means for searching, within said source code, a set of related code elements of said selected source code element, said elements of said set comprising typified properties;

means for creating a data structure comprising the properties of said code elements of said set of code elements;

means for grouping, within said data structure, said properties in function of their types;

means for displaying said properties grouped together within a portion of means of displaying said source code.

7. A non-transitory computer-readable medium comprising a computer program stored there, which is executable by a micro-processor, wherein the program comprises program code instructions for execution of a method of displaying properties of a source code element of a computer program being edited, when executed by the micro-processor, wherein said program is written in an object type or component type language, and wherein the method comprises:

selecting, within said source code, said source code element;

searching with the micro-processor, within said source code, a set of related code elements of said selected source code element, said elements of said set comprising properties, which have a type;

creating a data structure with the micro-processor, the data structure comprising said properties of said code elements of said set of code elements;

grouping with the micro-processor, within said data structure, said properties in function of their types; and displaying said properties grouped within a portion of a display displaying said source code.

* * * * *